United States Patent [19]

Wilbeck

[11] 4,002,334
[45] Jan. 11, 1977

[54] DUAL FRAME OFFSET DISC IMPLEMENT WITH TONGUE MEMBERS AND A TOW BAR ARRANGED FOR MOVEMENT BETWEEN SIDE BY SIDE RELATION AND A TRAILING RELATION

[75] Inventor: Jerry L. Wilbeck, South Hutchinson, Kans.

[73] Assignee: Wilbeck Machine and Manufacturing, Inc., South Hutchinson, Kans.

[22] Filed: Sept. 17, 1975

[21] Appl. No.: 614,007

[52] U.S. Cl. .............................. 172/581; 172/314; 280/412

[51] Int. Cl.² ......................................... A01B 65/00

[58] Field of Search ....... 280/411 C, 411 A, 411 B, 280/411 R, 412, 413; 172/310, 314, 581, 250, 254, 245

[56] References Cited

UNITED STATES PATENTS

| | | | |
|---|---|---|---|
| 3,334,916 | 8/1967 | Tibbals | 280/412 |
| 3,544,131 | 12/1970 | Pennington | 280/412 |
| 3,708,018 | 1/1973 | Wilbeck | 172/313 |
| 3,727,697 | 4/1973 | Wilbeck | 280/412 |

*Primary Examiner*—M. H. Wood, Jr.
*Assistant Examiner*—John A. Pekar
*Attorney, Agent, or Firm*—Fishburn, Gold & Litman

[57] ABSTRACT

An earth working apparatus in the form of a dual frame offset disc implement includes first and second tongue members and a tow bar arranged for movement of first and second mobile frames between a side-by-side earth working position and a trailing relation while maintaining hydraulic communication between a hydraulic pressure system of a prime mover and each of a first pair of extensible members each connected to a respective one of the tongue members and to a respective one of the dual frames and to each of a second pair of extensible members each connected to a respective one of the dual frames and to wheel supporting axles for turning same to selectively raise and lower the respective dual frames thereby moving earth working members thereon out of and into earth working position.

12 Claims, 14 Drawing Figures

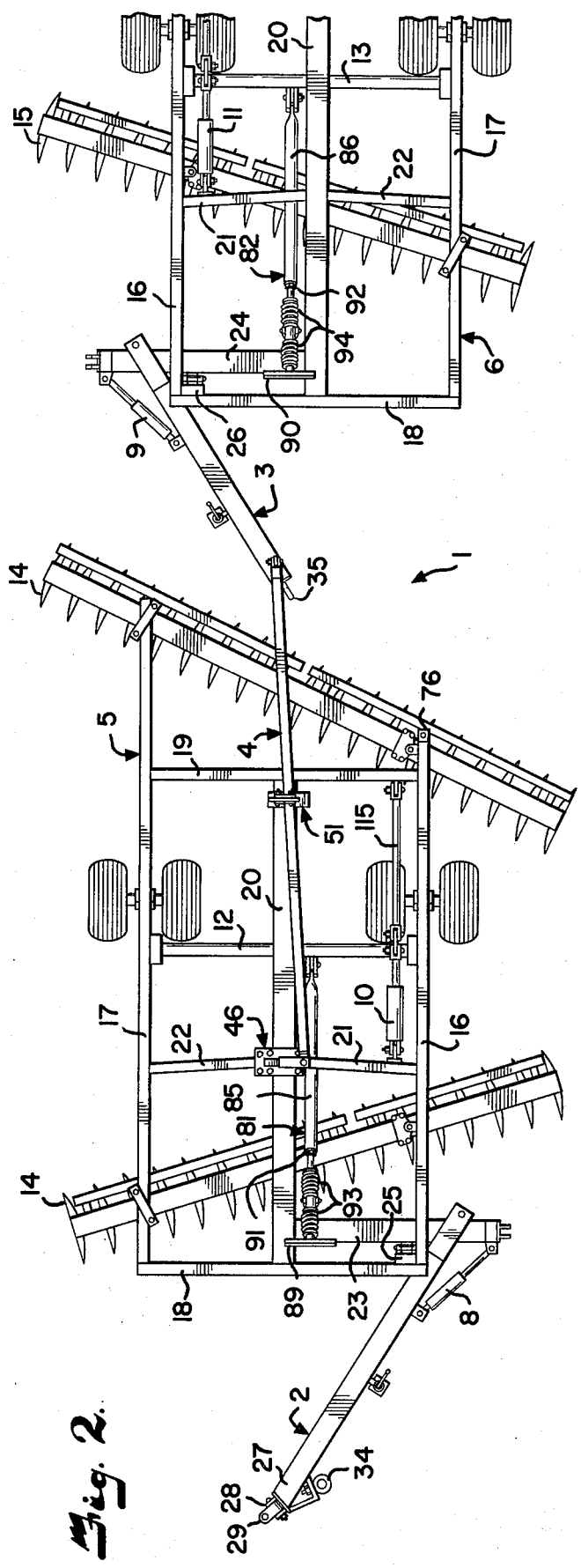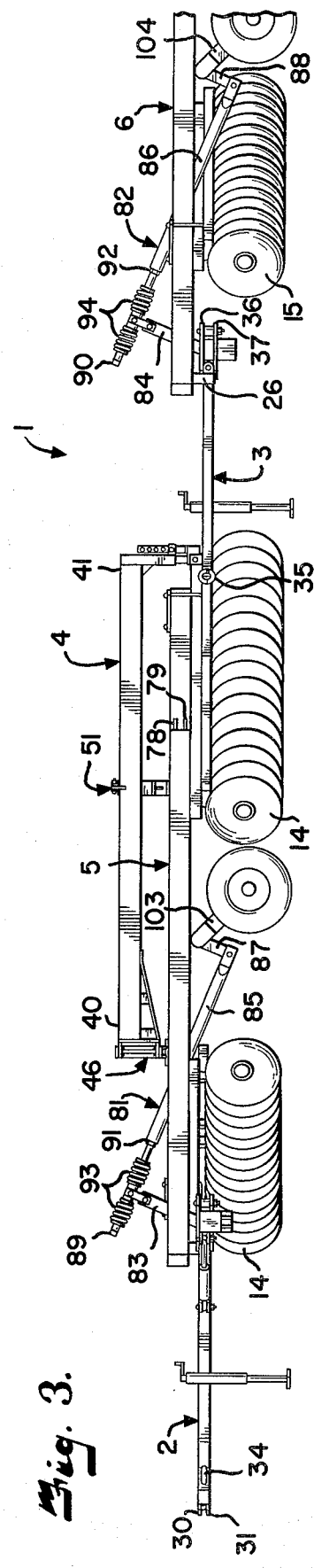

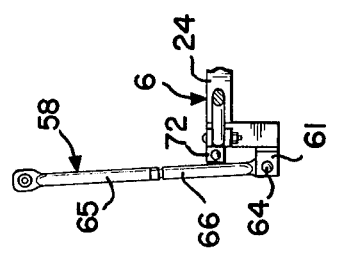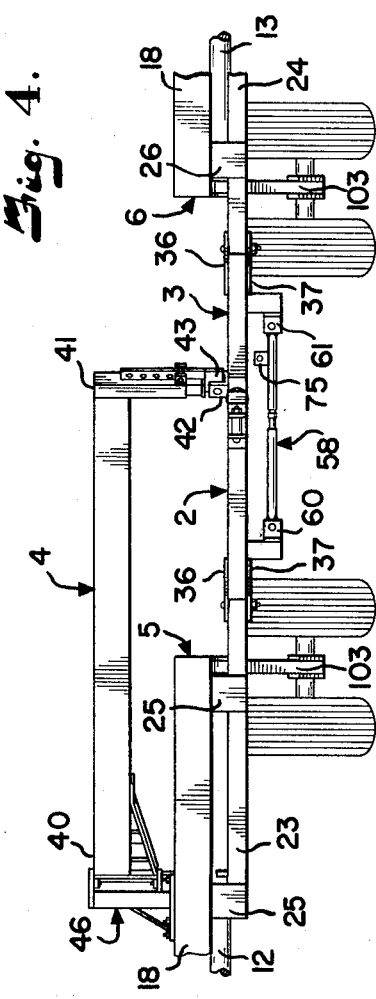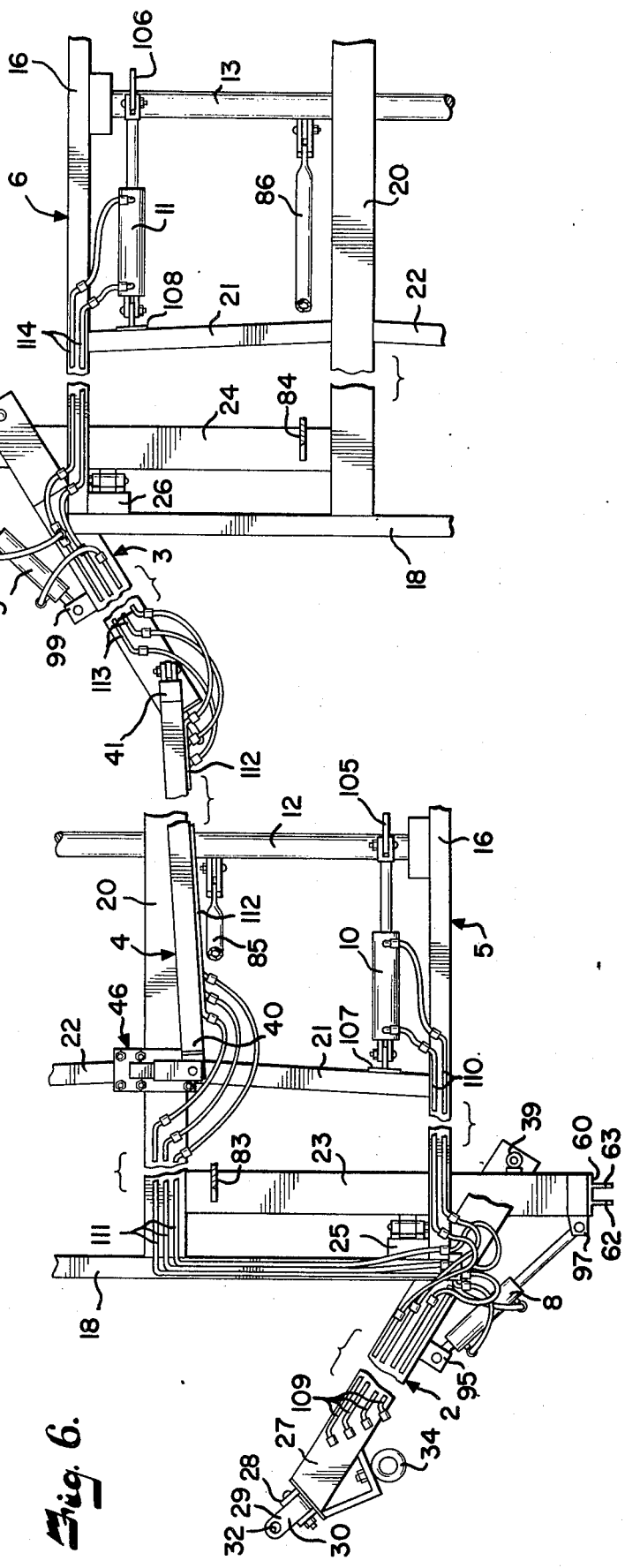

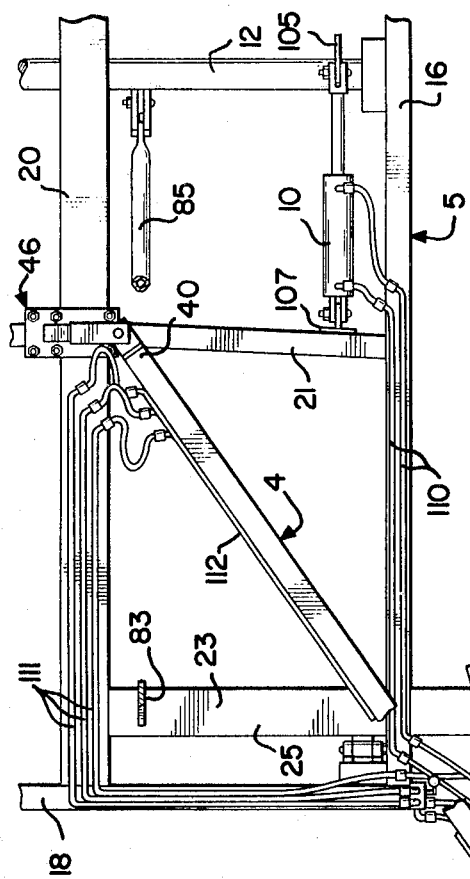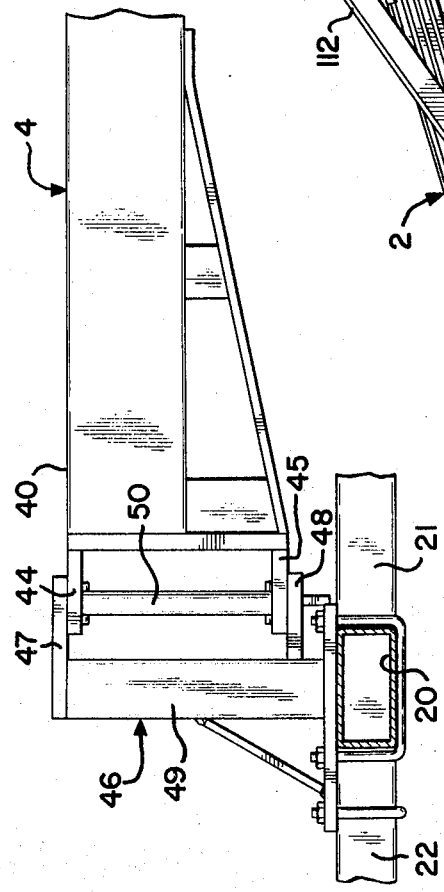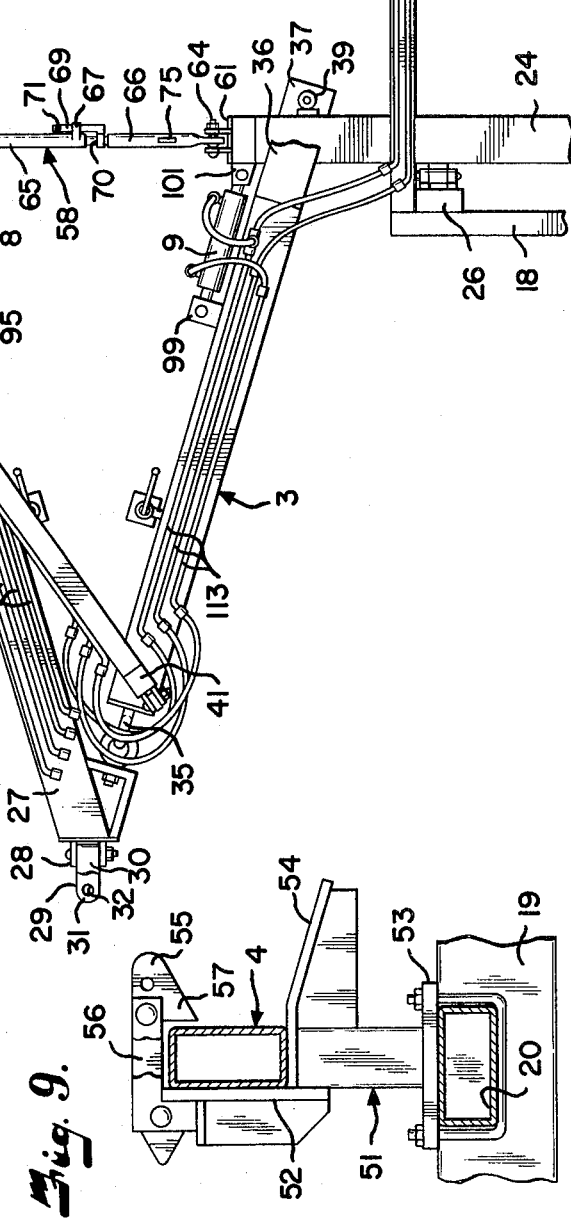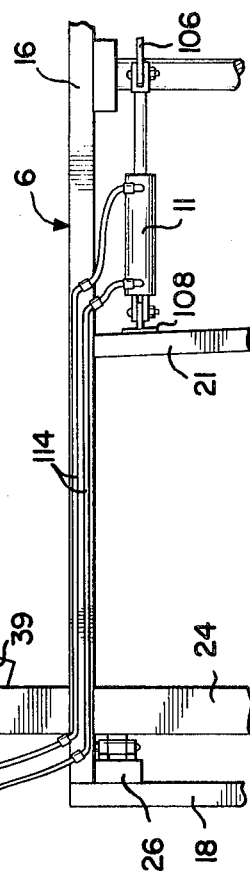
Fig. 5.
Fig. 8.
Fig. 9.

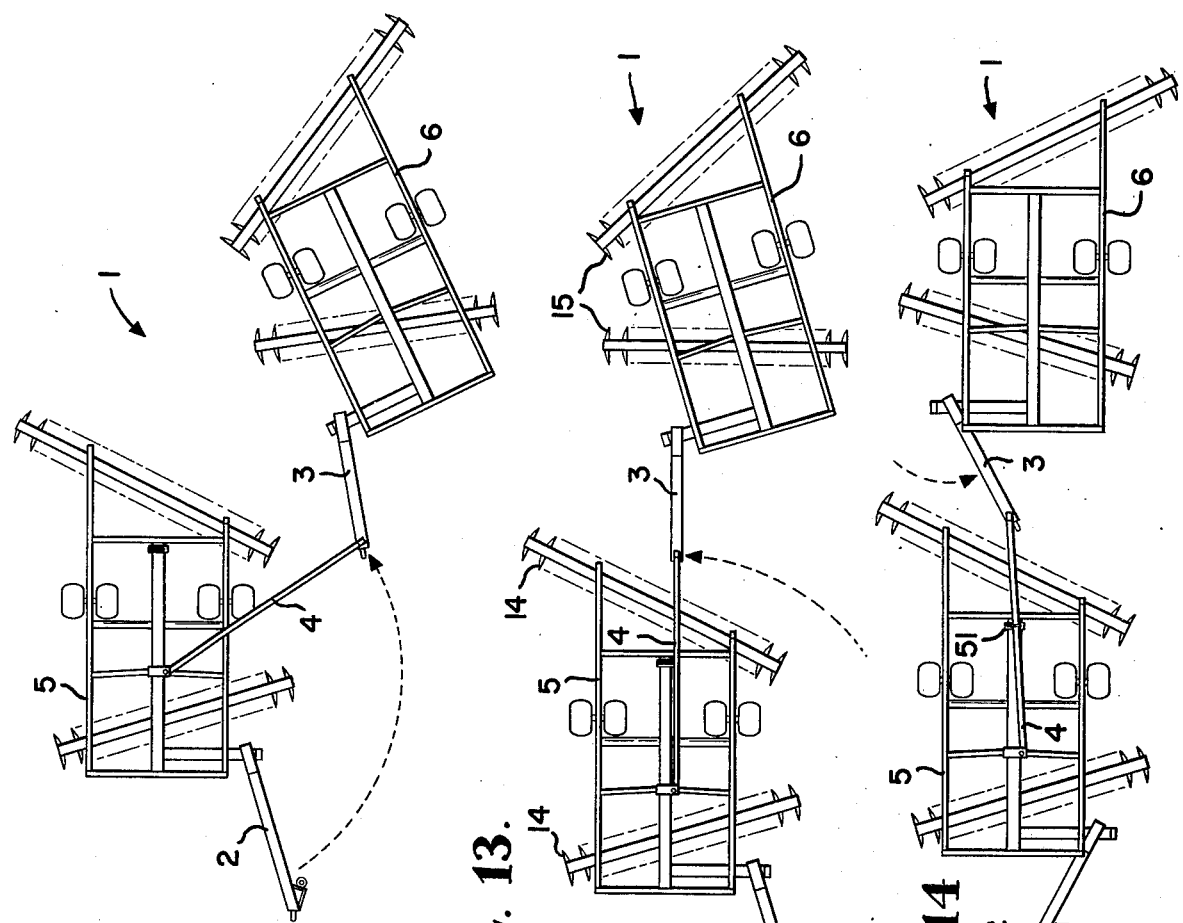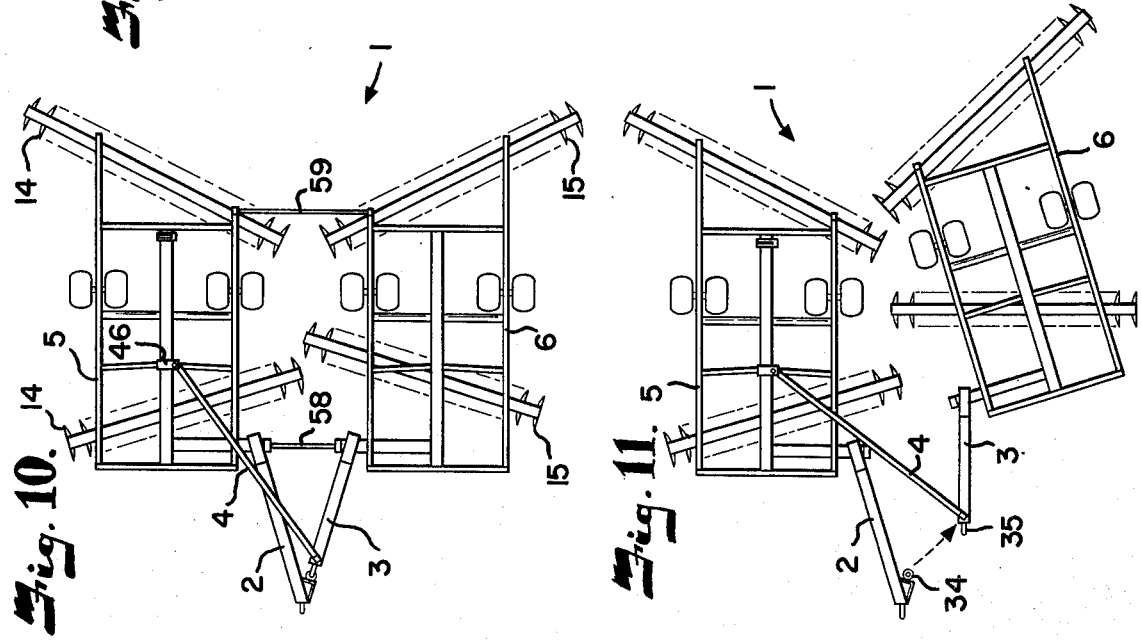

DUAL FRAME OFFSET DISC IMPLEMENT WITH TONGUE MEMBERS AND A TOW BAR ARRANGED FOR MOVEMENT BETWEEN SIDE BY SIDE RELATION AND A TRAILING RELATION

The present invention relates to disc implements and more particularly to an offset disc implement having first and second units maintained in a side-by-side position and having first and second tongue members and a tow bar arranged for movement of the frames between a side-by-side earth working position and trailing relation all under control of an operator on a prime mover.

The principal objects of the present invention are: to provide an earth working apparatus having first and second frames movable between a side-by-side earth working position and trailing relation all under control of a single operator on a prime mover; to provide such an earth working apparatus with first and second tongue members and a tow bar arranged for movement between the side-by-side position and the trailing relation without requiring release and reconnection of either of the tongue members from the tow bar; to provide such an earth working apparatus having a pair of extensible members each operative for selectively moving a respective one of the tongue members between a first position with the dual frames in side-by-side working position and a second position with the frames in trailing relation all under control of an operator while on the prime mover; to provide such an earth working apparatus having hydraulic lines extending from a hydraulic pressure system on the prime mover and arranged on the tongue members, tow bar, and first and second frames in a manner to maintain hydraulic communication between the hydraulic pressure system of the prime mover and the extensible members on the first and second frames while moving between the first position with the frames in side-by-side relation and the second position with the frames in trailing relation; to provide such an earth working apparatus adapted for working a path of at least 21 feet and up to and including 35 feet wide; and to provide such an earth working apparatus which is durable in construction, positive in operation, economical to manufacture, and particularly well adapted for the proposed use.

Other objects and advantages of this invention will become apparent from the following description taken in connection with the accompanying drawings wherein are set forth, by way of illustration and example, certain embodiments of this invention.

The drawings constitute a part of the specification and include an exemplary embodiment of the present invention and illustrate various objects and features of the dual frame twin offset disc implement with tongue members and a tow bar arranged for movement between side-by-side relation and a trailing relation.

FIG. 2 is a top plan view of the earth working apparatus with the frames shown in trailing relation.

FIG. 3 is a fragmentary side elevational view showing the tongue members and tow bar with the frames in trailing relation.

FIG. 4 is an enlarged fragmentary front elevational view showing the tongue members and the tow bar.

FIG. 5 is a further enlarged fragmentary plan view of the earth working apparatus and showing a hydraulic system therefor with the frames shown in side-by-side relation.

FIG. 6 is also a further enlarged fragmentary plan view of the earth working apparatus showing the hydraulic system with the frames in trailing relation.

FIG. 7 is also a further enlarged fragmentary elevational view showing a front spacer member in a storage position.

FIG. 8 is a fragmentary elevational view of one end portion of the tow bar and means for mounting same and shown at an increased scale.

FIG. 9 is an elevational view of tow bar holding means and also shown at an increased scale.

FIG. 10 is a diagramatic plan view at a reduced scale with the dual frames shown in side-by-side relation.

FIG. 11 is a diagramatic plan view at a reduced scale showing an early position during movement of the frames to trailing relation.

FIG. 12 is a diagramatic plan view at a reduced scale with the dual frames shown in an intermediate position during movement to trailing relation.

FIG. 13 is a diagramatic plan view at a reduced scale with the dual frames shown in trailing relation.

FIG. 14 is a diagramatic plan view at a reduced scale with the dual frames shown in longitudinally aligned trailing relation after alignment of their respective tongue members.

Figure 1:
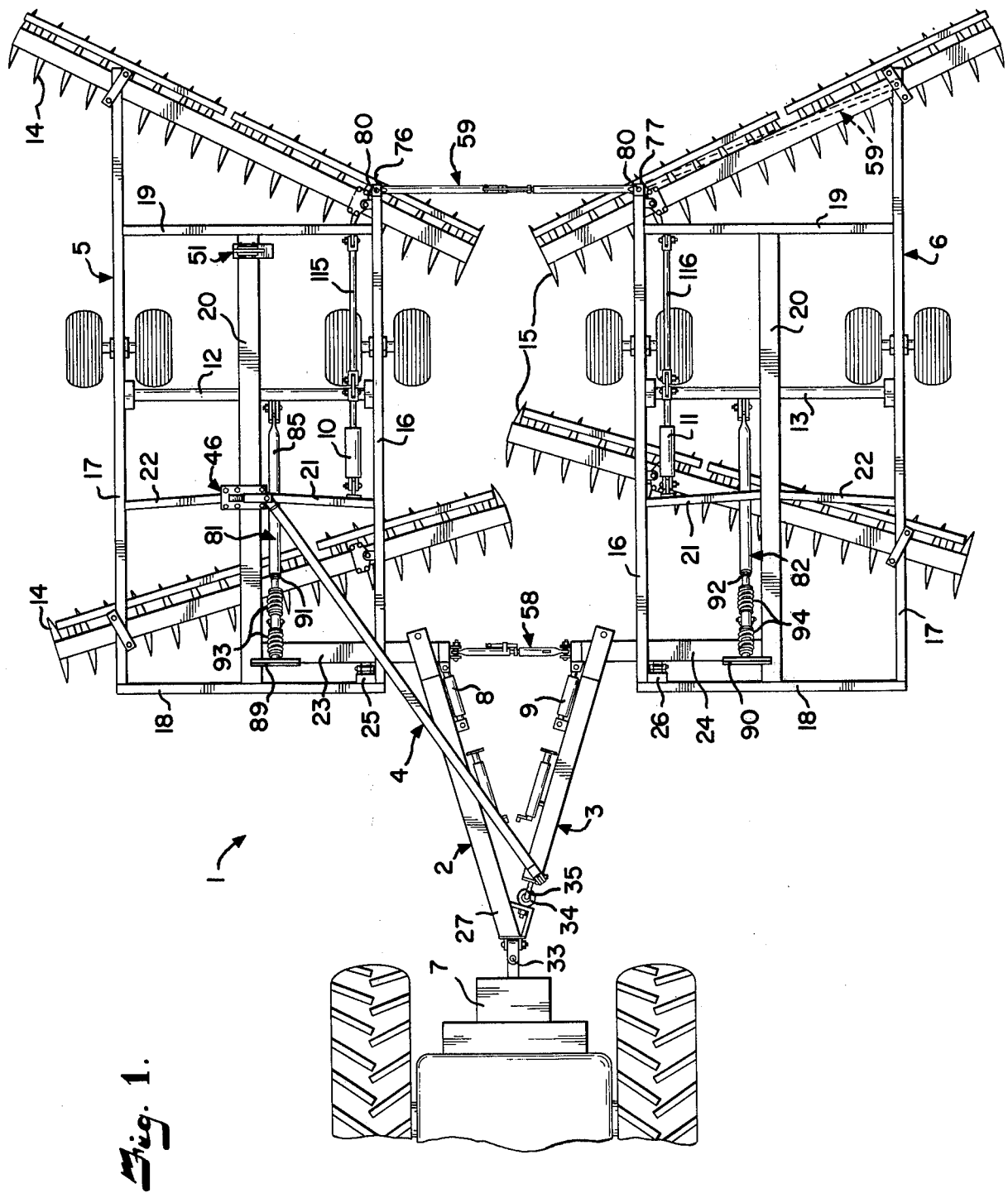
FIG. 1 is a top plan view of an earth working apparatus embodying features of the present invention and showing first and second frames in side-by-side earth working position.

As required, detailed embodiments of the present invention are disclosed herein, however, it is to be understood that the disclosed embodiments are merely exemplary of the invention which may be embodied in various forms. Therefore, specific structural and functional details herein are not to be interpreted as limiting but merely as a basis for the claims and as a representative basis for teaching one skilled in the art to variously employ the present invention in virtually any appropriately detailed structure.

Referring more in detail to the drawings:

In the disclosed embodiment of the present invention, the reference numeral 1 generally designates an earth working apparatus in the form of a dual frame offset disc implement. The earth working apparatus 1 includes first and second tongue members 2 and 3 and a tow bar 4 arranged for movement of first and second frames 5 and 6 between a side-by-side earth working position and trailing relation while maintaining hydraulic communication between a hydraulic pressure system of a prime mover 7 and each of a first pair of extensible members 8 and 9 each connected to a respective one of the tongue members 2 and 3 and to a respective one of the first and second frames 5 and 6 and to each of a second pair of extensible members 10 and 11 each connected to a respective one of the first and second frames 5 and 6 and to wheel supporting axles 12 and 13 for turning same to selectively raise and lower the first and second frames 5 and 6 respectively thereby moving earth working members 14 and 15 thereon out of and into earth working position.

The earth working apparatus 1 of the present invention is an improvement over the structure illustrated in U.S. Pat. No. 3,708,018, issued Jan. 2, 1973, to Robert A. Wilbeck for TWIN OFFSET DISC IMPLEMENT WITH RELEASABLE FASTENING MEANS CONNECTING DUAL FRAMES and the structure illustrated in U.S. Pat. No. 3,727,697, issued Apr. 17, 1973, to Robert A. Wilbeck for EARTH WORKING IMPLEMENT WITH A PAIR OF MOBILE UNITS MOV-

ABLE BETWEEN SIDE-BY-SIDE WORKING POSITION AND A TRAILING POSITION.

The first and second frames 5 and 6 of the earth working apparatus 1 are substantially rigid structures each having laterally spaced side members 16 and 17 positioned as interior and exterior members respectively when the frames 5 and 6 are arranged in the side-by-side position. The side members 16 and 17 of each of the frames 5 and 6 each have a forward end thereof suitably secured to a forward or front member 18. Each of the frames 5 and 6 include a rear member 19 extending between and having opposite ends thereof suitably secured to the side members 16 and 17.

Each of the frames 5 and 6 may have a longitudinally extending center member 20 having opposite ends thereof suitably connected to the front and rear members 18 and 19 thereof. Each of the frames 5 and 6 preferably has a transversely extending brace member thereby forming a substantially rigid structure. In the illustrated embodiment, the brace member is formed of a first portion 21 extending between and having opposite ends thereof suitably secured to the interior side member 16 and the center member 20. The brace member includes a second portion 22 extending between and having opposite ends thereof suitably secured to the exterior side member 17 and the center member 20.

Each of the frames 5 and 6 has means on respective forward end portions thereof for pivotally mounting the first and second tongue members 2 and 3 respectively thereon. In the illustrated structure, the frames 5 and 6 have arms 23 and 24 respectively mounted thereon and extending laterally from the forward end portion and positioned adjacent the front member 18 thereof. The arms 23 and 24 have respective free ends thereof spaced from the interior side member 16 of the respective mobile frame. The arms 23 and 24 are in generally aligned and opposed relation when the frames 5 and 6 are in the side-by-side position. The one end of the tongue members 2 and 3 is pivotally mounted on the arms 23 and 24 respectively and positioned adjacent the free end thereof. The free ends of the arms 23 and 24 have depending portions, for a purpose later described. The frames 5 and 6 have depending hanger members 25 and 26 on the forward end portion thereof with the arms 23 and 24 suitably secured thereto, as best seen in FIGS. 1 to 4 inclusive.

The tongue members 2 and 3 are each formed of suitable structural members, such as a rectangular tubular member. The free ends of the tongue members 2 and 3 have means thereon for effecting connection between the tongue members 2 and 3 and the prime mover 7. In the illustrated structure, the free end of one tongue member, for example tongue member 2 on the first frame 5, has a mounting portion 27 thereon and includes a bracket 28 pivotally supporting a clevis 29 adapted to be pivotally connected to the prime mover 7. The clevis 29 has upper and lower plates or bars 30 and 31 each having an aperture 32 therein. The apertures 32 are vertically aligned and positioned to be on the center line of the earth working implement 1 when the frames 5 and 6 are in the side-by-side position. The apertures 32 are adapted to receive a suitable fastening member 33, such as a pin, bolt, or the like, thereby pivotally connecting the earth working implement 1 to the prime mover 7.

The mounting portion 27 includes an offset portion having a towing ring 34 mounted thereon and extending outwardly therefrom to be releasably engaged by a pintle hook 35 mounted on a free end of the other tongue member 3. When the pintle hook 35 engages the towing ring 34 and the clevis 29 is connected to the prime mover 7 and spacer means, as later described, is in position between the frames 5 and 6, forward movement of the prime mover 7 effects coordinated forward movement of both of the frames 5 and 6, such as for earth working.

In the illustrated structure, one end of the tongue members 2 and 3 is pivotally mounted on the arms 23 and 24 respectively. The one end of the tongue members 2 and 3 is bifurcated and each has upper and lower plates 36 and 37 each having an aperture 38 therein. A rearward face of each of the arms 23 and 24 has a sleeve 39 thereon and spaced from the free end of the respective arm. The apertures 38 in the upper end lower plates 36 and 37 are alignable with the sleeve 39 to receive suitable fastening means, such as a pivot pin, thereby pivotally connecting one end of the tongue members 2 and 3 to the arms 23 and 24 respectively.

The tow bar 4 has one end portion 40 thereof pivotally mounted on one of the mobile frames, for example the first mobile frame 5, and an other end portion 41 thereof pivotally mounted on the tongue member 3 of the second mobile frame 6 whereby the frames 5 and 6 may be moved from side-by-side relation to a position with the second mobile frame 6 in trailing relation with the first frame 5 upon release of the pintle hook 35 and forward movement of the prime mover 7.

In the illustrated embodiment, a clevis 42 is rotatably mounted on an upper surface of the tongue member 3 of the other frame 6. The clevis 42 has laterally spaced upwardly extending plates adapted to receive therebetween a rib 43 depending from the other end portion 41 of the tow bar 4. The one end portion 40 of the tow bar has a pair of upper and lower ears 44 and 45 extending laterally outwardly from the one end portion 40 of the tow bar 4 and each having an aperture therein.

A mounting bracket 46 is suitably secured to the first frame 5 intermediate the ends thereof and intermediate the interior and exterior side members 16 and 17 thereof. In the illustrated embodiment, the mounting bracket 46 is positioned on the center member 20 at the intersection of the brace member portions 21 and 22 therewith. The mounting bracket 46 has upper and lower ears 47 and 48 extending laterally outwardly from an upstanding portion 49 and each having an aperture therein. The upper and lower ears 44 and 45 on the one end portion 40 of the tow bar 4 are received between the upper and lower ears 47 and 48 of the mounting bracket 46 with the respective apertures therein aligned to receive a suitable pivot pin 50 therein.

The rear end portion of the first mobile frame 5 has tow bar holding means 51 mounted thereon for holding the tow bar 4 against swinging movement when the mobile frames 5 and 6 are positioned in trailing relation. The illustrated holding means 51 is mounted on the center member 20 adjacent the rear member 19 and includes an upstanding portion 52 extending upwardly from a support bracket 53 mounted on the center member 20 and on the right or first mobile frame 5. The upstanding portion 52 is engageable by the tow bar 4 and a support arm 54 extends outwardly therefrom for supporting the tow bar 4 when the same is in towing or trailing position. A holding member 55 has one end thereof pivotally mounted on the upper end of the upstanding portion 52 and is illustrated as a generally L-shaped member having an arm portion 56 engageable with an upper surface of the tow bar 4 and a keeper portion 57 mounted on the arm portion 56 with the keeper portion 57 being movable into engagement with the tow bar 4 thereby holding same in a towing position.

Spacer members have ends releasably connecting the spaced mobile frames 5 and 6 in side-by-side relation and cooperate with the tongue members 2 and 3 to maintain spacing of the frames 5 and 6 during side-by-side operation. The spacer means is separated from one of the mobile frames for a change of relative positions of the frames. In the illustrated embodiment, the spacer means includes a front spacer member 58 extending between free ends of the arms 23 and 24 and a rear spacer member 59 extending between end portions of the interior side members 16 of the frames 5 and 6.

The spacer members 58 and 59 are preferably substantially rigid members adapted to resist and withstand both tension and compression as the mobile frames 5 and 6 are performing earth working operations. The front and rear spacer members 58 and 59 have universal connections with the frames to permit independent relative movement therebetween. It is preferred that the spacer members 58 and 59 be formed in two sections which may be connected together to form a rigid structure which permits relative movement between the two sections and locks the frames 5 and 6 in side-by-side working position and releases the second frame 6 thereby permitting same to move to the trailing relation.

The illustrated front spacer member 58 extends between and is connected to the depending portions at the free ends of the arms 23 and 24 thereby maintaining the forward end portions of the frames 5 and 6 in spaced side-by-side relation. Mounting brackets 60 and 61 are secured on the depending portion of the free ends of the arms 23 and 24 respectively. Each of the brackets 60 and 61 has laterally spaced ears 62 and 63 extending outwardly therefrom and toward the center line of the earth working implement 1. Each of the opposite ends of the front spacer member 58 is retained in the respective brackets, as by a suitable pin 64.

The ends of the front spacer member 58 are formed in ball and socket or universal joints to permit relative movement in any direction between the frames 5 and 6 and the spacer member 58. Such a ball and socket or universal joint is illustrated in FIG. 5 of the hereinbefore mentioned U.S. Pat. No. 3,708,018.

In the illustrated embodiment, the front spacer member 58 has separable portions connectable together and includes a first portion 65 having one end thereof mounted on one of the mounting brackets, for example the mounting bracket 60 on the free end of the arm 23, and a second portion 66 having one end thereof pivotally mounted on the other mounting bracket 61 on the free end of the arm 24. The first portion 65 has a pair of spaced ears 67 extending outwardly therefrom and positioned adjacent the free end thereof. The second portion 66 has an elongated rib 69 extending along a free end portion thereof. A first abutment 70 is provided on the second portion 66 and engageable by the first portion 65 thereby defining a minimum length of the front spacer member 58. A second abutment 71 is mounted on the free end of the elongated rib 69 and is engageable with the ears 67 on the first portion 65 thereby defining a maximum length of the front spacer member 58.

It is desirable that the front spacer member 58 be separated from one of the frames 5 and 6 for a change of relative position of the frames 5 and 6 and that the front spacer member 58 be suitably supported when not connected to both of the frames 5 and 6. Therefore, the free end of the arm 24 of the second frame 6 has a bracket 72 thereon positioned above the mounting bracket 61 and having laterally spaced ears 73 and 74 with aligned apertures therein. The second portion 66 of the front spacer member 58 has a rib 75 thereon with an aperture therein alignable with the apertures in the ears 73 and 74 of the bracket 72 when the front spacer member 58 is in a raised position and adapted to receive a suitable fastening member therein for retaining same in the raised position.

The rear spacer member 59 extends between suitable mounting brackets 76 and 77 on rear ends of the interior side members 16 of the frames 5 and 6 and each of the mounting brackets 76 and 77 on rear ends of the interior side members 16 of the frames 5 and 6 and each of the mounting brackets 76 and 77 has vertically spaced upper and lower ears 78 and 79 extending rearwardly from a rear end of the respective interior side member 16. The ends of the rear spacer member 59 are also formed in ball and socket or universal joints to permit relative movement in any direction between the frames 5 and 6 and the rear spacer member 59. The opposite ends of the rear spacer member 59 are suitably retained in the brackets 76 and 77, as by a pin 80.

The rear spacer member 59 is substantially similar to the front spacer member 58 except the rear spacer member 59 is turned 90° relative to the front spacer member 58 and is adapted to define a minimum and maximum spacing between the rear end portions of the mobile frames 5 and 6.

The mobile frames 5 and 6 are independently adjusted for longitudinal leveling by leveling device 81 and 82 respectively to maintain the mobile frames 5 and 6 in a substantially level position during earth working operations. The leveling devices 81 and 82 include levers 83 and 84 having lower ends thereof suitably connected to the arms 23 and 24 respectively. The leveling devices 81 and 82 include adjustable members 85 and 86 extending between and having respective opposite ends pivotally connected on an upper end of the levers 83 and 84 respectively and on ears 87 and 88 on the axles 12 and 13 respectively.

Suitable handles or cranks 89 and 90 are mounted on an upper end of the adjustable members 85 and 86 respectively for effecting a change in the length thereof, as by telescopeable joints 91 and 92 positioned intermediate the ends of the leveling devices 81 and 82 respectively and movement of the levers 83 and 84. Change in length of the adjustable members 85 and 86 adjusts the vertical position of the arms 23 and 24 respectively to thereby level the mobile frames 5 and 6 when the earth working means 14 and 15 thereon are in any selected position. Suitable resilient members 93 and 94 are positioned on opposite sides of the levers 83 and 84 respectively to absorb the shock during earth working operations.

The extensible members 8 and 9 are positioned adjacent an inwardly facing side of the tongue members 2 and 3 respectively when the frames 5 and 6 are in side-by-side position. The extensible member 8 has opposite ends thereof pivotally mounted on the side of the tongue member 2 and on the forward side of the arm 23. In the illustrated embodiment, vertically spaced ears 95 are mounted on the inwardly facing side of the tongue member 2 and are adapted to pivotally support one end of the extensible member 8 thereon. Vertically spaced ears 97 are mounted on the forwardly facing side of the arm 23 and adapted to pivotally support the other end of the extensible member 8 thereon.

The extensible member 9 has opposite ends thereof pivotally mounted on the side of the tongue member 3 and on the forward side of the arm 24. In the illustrated embodiment, vertically spaced ears 99 are mounted on the inwardly facing side of the tongue member 3 and adapted to pivotally support one end of the extensible member 9 thereon. Vertically spaced ears 101 are mounted on the forwardly facing side of the arm 24 and adapted to pivotally support the other end of the extensible member 9 thereon.

Each of the mobile frames 5 and 6 have means thereon permitting selectively raising and lowering the respective frame to move the respective earth working means 14 and 15 thereon out of and into earth working position. The second pair of extensible members 10 and 11 have one end portion thereof connected to the frames 5 and 6 and an other end portion thereof connected to the respective means permitting raising and lowering the frame whereby the second pair of extensible members 10 and 11 are operative to selectively raise and lower the respective frames.

The means permitting raising and lowering the frames 5 and 6 includes the axles 12 and 13 each illustrated as an elongated tubular member having opposite end portions thereof rotatably mounted on a lower surface of the interior and exterior side members 16 and 17 of the respective frame. In the illustrated structure, the axles 12 and 13 are generally U-shaped members each having a center portion rotatably mounted on the side members 16 and 17 of the respective frame and wheel mounting arms 103 and 104 extending from opposite end portions of the center portion thereof. Each of the arms 103 and 104 is adapted to have at least one and preferably a pair of wheels rotatably mounted thereon, as on axle portions extending substantially perpendicular thereto. The axles 12 and 13 have second ears 105 and 106 respectively extending from the center portion thereof to pivotally support thereon a respective one of the extensible members 10 and 11.

The second pair of extensible members 10 and 11 each have one end portion thereof pivotally connected to brackets 107 and 108 mounted on the frames 5 and 6 respectively. In the illustrated structure, the brackets 107 and 108 are mounted on the first portion 21 of the brace member extending between the exterior side member 16 and the center member 20 of the respective frames 5 and 6.

The prime mover 7 for moving the earth working implement 1 has a hydraulic pressure system thereon. A plurality of hydraulic lines extend from the hydraulic pressure system of the prime mover and are respectively operatively connected to each of the extensible members 8 and 9 of the first pair of extensible members and operatively connected to each of the extensible members 10 and 11 of the second pair of extensible members.

Certain portions of the hydraulic lines are positioned on the tongue members 2 and 3 and on the tow bar 4 in a manner to permit movement of the mobile frames 5 and 6 between the first position with the frames in side-by-side relation and the second position with the frames in trailing relation while maintaining hydraulic communication between the hydraulic pressure system of the prime mover 7 and each extensible member 8 and 9 of the first pair of extensible members and each extensible member 10 and 11 of the second pair of extensible members.

A first plurality of conduits 109 are mounted on the tongue member 2 of the first mobile frame 5 and each of the conduits 109 is adapted to receive therein at least one of the hydraulic lines extending from the prime mover 7. The conduits 109 of the first plurality of conduits each have an entrance positioned adjacent the mounting portion 27 of the tongue member 2 of the first frame 5 and an exit positioned adjacent the arm 23.

A second plurality of spaced conduits 110 is mounted on the first mobile frame 5 and adapted to receive certain of the hydraulic lines communicating with the extensible member 10 of the second pair of extensible members mounted on the first mobile frame 5. The conduits 110 are mounted on the interior side member 16 of the first mobile frame 5 and have an entrance positioned adjacent the front member 18 of the first or right frame 5 and an exit adjacent the extensible member 10 on the right or first mobile frame 5.

A third plurality of conduits 111 are mounted on the one or right mobile frame 5 and adapted to receive certain other of the hydraulic lines communicating with the extensible members 9 and 11 on the second or left frame 6. The conduits 111 of the third plurality of conduits each have an entrance adjacent the interior side member 16 of the right mobile frame 5 and an exit adjacent the mounting bracket 46. The conduits 111 extend along the front member 18 to the center member 20 and then along the center member 20 to the position adjacent the mounting bracket 46.

A fourth plurality of spaced conduits 112 are mounted on the tow bar 4 and adapted to receive the certain other hydraulic lines from the third plurality of conduits 111. The conduits 112 of the fourth plurality of conduits each have an entrance positioned adjacent the one end portion 40 of the tow bar 4 and an exit adjacent the other end portion 41 of the tow bar 4.

A fifth plurality of spaced conduits 113 are mounted on the tongue member 3 on the second or left mobile frame 6 and are adapted to receive the certain other hydraulic lines from the fourth plurality of conduits 112 mounted on the tow bar 4. The conduits 113 of the fifth plurality of conduits each have an entrance positioned adjacent the clevis 42 on the free end of the tongue member 3 with the other end portion 41 of the tow bar 4 mounted thereon and an exit positioned adjacent the arm 24 and the extensible member 9 connected thereto.

A sixth plurality of spaced conduits 114 are mounted on the left or second mobile frame 6 and adapted to receive certain of the first mentioned certain other hydraulic lines communicating with extensible member 11 of the second pair of extensible members mounted on the second mobile frame 6. The conduits 114 of the sixth plurality of conduits each have an entrance adjacent the front member 18 and an exit adjacent the extensible member 11 on the second or left mobile frame 6.

It is desirable to maintain or hold the earth working means 14 and 15 out of engagement with a ground surface or a road surface during moving the earth working apparatus 1 between fields or over the road, therefore, transport position lockout member 115 and 116 are mounted on the first and second frames 5 and 6 respectively. The lockout members 115 and 116 extend between the ears 105 and 106 on the axles 12 and 13 respectively and the rear member 19 of the frames 5 and 6 respectively. The lockout members 115 and 116 are operative to resist turning of the axles 12 and 13 in the event of failure of the hydraulic system of the prime mover 7 or of the extensible members 10 and 11 respectively. The lockout members 115 and 116 are operative to hold the axles 12 and 13 in a position supporting the earth working means 14 and 15 out of ground engagement when the earth working apparatus 1 is disconnected from the hydraulic system of the prime mover 7, such as for storage.

In preparation for using an offset disc implement constructed as illustrated and described, the frames 5 and 6 are positioned in side-by-side relation and the tongue members 2 and 3 are connected together and to the prime mover 7. The front and rear spacer members 58 and 59 are connected to the frames 5 and 6 and maintain the frames 5 and 6 in a selected lateral spacing while permitting same to be independently raised and lowered and positioned in a substantially level position by operation of the leveling devices 81 and 82. The extensible members 10 and 11 are independently adjusted to effect the desired penetration of the earth working means 14 and 15. The frames 5 and 6 may be independently adjusted by the leveling devices 81 and 82 to position and maintain the respective frame in a substantially level position during earth working operations and during travel between fields and the like.

When it is desired to change from the side-by-side position to trailing relation, the pintle hook 35 is disconnected from the towing ring 34 on the mounting portion 27 of the tongue member 2. The front spacer member 58 is disconnected from the first or right mobile frame 5 and placed in the storage position and connected to the upper bracket 72. The rear spacer member 59 is disconnected from the right mobile frame 5 and placed in a storage position on the left mobile frame 6 by swinging same approximately 180°. The disconnected end of the rear spacer member 59 is then mounted on a suitable pin extending upwardly from the exterior side member 17 of the second frame 6. The extensible members 10 and 11 are operated to raise the frames 5 and 6 thereby moving the earth working means 14 and 15 out of ground engagement. The prime mover 7 is then moved forwardly with the tow bar 4 forcing the left mobile frame 6 outwardly and away from the forward end portion of the right mobile frame 5. When the tow bar 4 has moved to a position in engagement with the tow bar holding means 51, the keeper portion 57 is lowered and secured in the lowered position. The extensible members 8 and 9 are operated to effect longitudinal alignment of the prime mover 7, first mobile frame 5, and second mobile frame 6.

It is to be understood that while I have illustrated and described one form of my invention it is not to be limited to the specific form or arrangement of parts herein described and shown.

What I claim and desire to secure by Letters Patent is:

1. An earth working apparatus comprising:
   a. first and second spaced mobile frames each having a forward end portion and a rear end portion and laterally spaced side members extending therebetween;
   b. means on each of said frames for earth working as said frames are moved forward;
   c. first and second tongue members having one end thereof pivotally mounted on the forward end portion of respective first and second of said mobile frames and an other end thereof having connecting means for effecting connection of said frames to each other and to a prime mover for operation in side-by-side relation;
   d. spacer means having ends releasably connecting said spacer mobile frames in side-by-side relation and cooperating with said tongue members to maintain spacing of said frames during side-by-side operation, said spacer means being separated from one of said mobile frames for change of relative positions of said frames; and
   e. tow bar means having one end portion thereof pivotally mounted on said first mobile frame and the other end portion thereof pivotally mounted on said tongue member of the second mobile frame whereby said mobile frames may be moved from side-to-side relation to a position with said second mobile frame in trailing relation with said first mobile frame upon disconnecting said second tongue from said first tongue and separating of said spacer means from one of said mobile frames, said pivotal mounting of said one end portion of the tow bar means on said first mobile frame and said other end portion of the tow bar means on the tongue member of the second mobile frame being maintained during side-by-side relation and trailing relation and movement of the mobile frames from one to the other of said relations.

2. An earth working apparatus as set forth in claim 1 including a pair of extensible members each having one end portion thereof pivotally connected to the forward end portion of respective first and second of said frames and an other end portion thereof pivotally connected to said respective first and second tongue member for selectively moving said respective tongue members between a first position with said frames in side-by-side relation and a second position with said frames in trailing relation.

3. An earth working apparatus as set forth in claim 2 including:
   a. means on each of said mobile frames permitting selectively raising and lowering said respective frame to move said respective earth working means thereon out of and into earth working position; and
   b. a second pair of extensible members each having one end portion thereof connected to respective first and second of said frames and an other end portion thereof connected to said respective means permitting raising and lowering said frame whereby said second pair of extensible members is operative to selectively raise and lower said respective frames.

4. An earth working apparatus as set forth in claim 3 wherein:
   a. the prime mover has a hydraulic pressure system thereon;
   b. a plurality of hydraulic lines extend from the hydraulic pressure system of the prime mover and are respectively operatively connected to each extensible member of said first named pair of extensible members and to each extensible member of said second pair of extensible members; and c. certain portions of said hydraulic lines are positioned on said tongue members and on said tow bar means in a manner to permit movement of said mobile frames between the first position with said frames in side-by-side relation and the second position with said frames in trailing relation while maintaining hydraulic communication between the hydraulic pressure system and each extensible member of said first named pair of extensible members and each extensible member of said second pair of extensible members.

5. An earth working apparatus as set forth in claim 4 including:

a. a first plurality of spaced conduits mounted on said tongue member on said first mobile frame and each adapted to receive therein at least one of said hydraulic lines extending from the prime mover;

b. a second plurality of spaced conduits mounted on said first mobile frame and adapted to receive certain of said hydraulic lines communicating with said respective extensible member of said second pair of extensible members mounted on said first mobile frames;

c. a third plurality of spaced conduits mounted on said first mobile frame and adapted to receive certain other of said hydraulic lines communicating with said respective extensible member of said first named pair and said respective extensible member of said second pair each mounted on said second mobile frame;

d. a fourth plurality of spaced conduits mounted on said tow bar means and adapted to receive said certain other hydraulic lines from said third plurality of conduits;

e. a fifth plurality of spaced conduits mounted on said tongue member on said second mobile frame and adapted to receive said certain other hydraulic lines from said fourth plurality of conduits; and f. a sixth plurality of spaced conduits mounted on said second mobile frame and adapted to receive certain of said certain other hydraulic lines communicating with said respective extensible member of said second pair of extensible members mounted on said second mobile frame.

6. An earth working apparatus as set forth in claim 5 wherein:

a. said conduits of said first plurality of conduits each have an entrance adjacent said connecting means and an exit adjacent the one end of said tongue member on said first mobile frame;

b. said conduits of said second plurality of conduits each have an entrance adjacent the forward end portion of said first mobile frame and an exit adjacent said respective extensible member of said second pair of extensible members mounted on said first mobile frame;

c. said conduits of said third plurality of conduits each have an entrance adjacent the forward end portion of said first mobile frame and an exit adjacent the one end portion of said tow bar means;

d. said conduits of said fourth plurality of conduits each have an entrance adjacent the one end portion of said tow bar means and an exit adjacent the other end portion of said tow bar means;

e. said conduits of said fifth plurality of conduits each have an entrance adjacent the other end of said tongue member on said second mobile frame and an exit adjacent the one end of said tongue member on said second mobile frame; and f. said conduits of said sixth plurality of conduits each have an entrance adjacent the forward end portion of said second mobile frame and an exit adjacent said respective extensible member of said second pair of extensible members mounted on said second mobile frame.

7. An earth working apparatus as set forth in claim 1 wherein:

a. said connecting means for effecting connection of said mobile frames to the prime mover is mounted on the other end of said tongue member of said first mobile frame;

b. said connecting means for effecting connection of said mobile frames to each other is mounted on the other end of each of said tongue members; and c. the other end portion of said tow bar means is pivotally mounted on the other end of said tongue member of the second mobile frame adjacent said respective connecting means thereon.

8. An earth working apparatus as set forth in claim 7 wherein:

a. the one end portion of said tow bar means is pivotally mounted on said first mobile frame intermediate the ends thereof and intermediate the side members thereof; and b. the rear end portion of said first mobile frame has tow bar holding means mounted thereon for holding said tow bar means against swinging movement when said mobile frames are positioned in trailing relation.

9. An earth working apparatus as set forth in claim 1 wherein:

a. said mobile frames each have an arm extending laterally from the respective forward end portion thereof and having a free end spaced therefrom;

b. said arms are in opposed relation when said mobile frames are in side-by-side relation; and c. the one end of each of said tongue members is pivotally mounted on a respective one of said arms and positioned adjacent the free end thereof.

10. An earth working apparatus as set forth in claim 9 including a pair of extensible members each having one end portion thereof pivotally connected to the free end of a respective one of said arms and an other end portion thereof pivotally connected to said respective tongue member for selectively moving said respective tongue members between a first position with said frames in side-by-side relation and a second position with said frames in trailing relation.

11. An earth working apparatus as set forth in claim 10 including:

a. means on each of said mobile frames permitting selectively raising and lowering said respective frame to move said respective earth working means thereon out of and into earth working position; and b. a second pair of extensible members each having one end portion thereof connected to a respective one of said means permitting raising and lowering said frame whereby said second pair of extensible members is operative to selectively raise and lower said respective frames.

12. An earth working apparatus as set forth in claim 11 wherein:

a. the prime mover has a hydraulic pressure system thereon;
b. a plurality of hydraulic lines extend from the hydraulic pressure system of the prime mover and are respectively operatively connected to each extensible member of said first named pair of extensible members and to each extensible member of said second pair of extensible members; and
c. certain portions of said hydraulic lines are positioned on said tongue members and on said tow bar means in a manner to permit movement of said mobile frames between the first position with said frames in side-by-side relation and the second position with said frames in trailing relation while maintaining hydraulic communication between the hydraulic pressure system and each extensible member of said first named pair of extensible members and each extensible member of said second pair of extensible members.

* * * * *